United States Patent [19]

(12) United States Patent (10) Patent No.: US 9,442,736 B2
Eickemeyer et al. (45) Date of Patent: Sep. 13, 2016

(54) TECHNIQUES FOR SELECTING A PREDICTED INDIRECT BRANCH ADDRESS FROM GLOBAL AND LOCAL CACHES

(71) Applicant: GLOBALFOUNDRIES INC, Grand Cayman (KY)

(72) Inventors: Richard James Eickemeyer, Rochester, MN (US); Tejas Karkhanis, White Plains, NY (US); Brian R. Konigsburg, Austin, TX (US); David Stephen Levitan, Austin, TX (US); Douglas Robert Gordan Logan, Austin, TX (US)

(73) Assignee: GLOBALFOUNDRIES INC, Grand Cayman (KY)

( * ) Notice: Subject to any disclaimer, the term of this patent is extended or adjusted under 35 U.S.C. 154(b) by 506 days.

(21) Appl. No.: 13/961,956

(22) Filed: Aug. 8, 2013

(65) Prior Publication Data

US 2015/0046690 A1 Feb. 12, 2015

(51) Int. Cl.
*G06F 9/44* (2006.01)
*G06F 9/38* (2006.01)

(52) U.S. Cl.
CPC .................................. *G06F 9/3844* (2013.01)

(58) Field of Classification Search
CPC ........................................................ G06F 9/38
See application file for complete search history.

(56) References Cited

U.S. PATENT DOCUMENTS

| 2002/0194464 A1 | 12/2002 | Henry et al. |
| 2005/0262332 A1 | 11/2005 | Rappoport et al. |
| 2009/0198981 A1 | 8/2009 | Levitan et al. |
| 2012/0005462 A1* | 1/2012 | Hall ...................... G06F 9/3808 712/239 |
| 2012/0005463 A1 | 1/2012 | Mestan et al. |

FOREIGN PATENT DOCUMENTS

| DE | 19923517 C1 | 6/2000 |
| WO | 03003195 A1 | 1/2003 |
| WO | 2009004709 A1 | 8/2009 |

OTHER PUBLICATIONS

Sinharoy, B. et al., "IBM POWER7 multicore server processor", IBM Journal of Research and Development, vol. 55, No. 3, pp. 1:1-1:29, May-Jun. 2011. URL: http://ieeexplore.ieee.org/stamp/stamp.jsp?tp=&arnumber=5757896&isnumber=5730623.
Tendler, J. M. et al., "POWER4 system microarchitecture", IBM Journal of Research and Development, vol. 46, No. 1, pp. 5-25, Jan. 2002. URL: http://ieeexplore.ieee.org/stamp/stamp.jsp?tp=&arnumber=5389044&isnumber=5389038.

* cited by examiner

*Primary Examiner* — Cheng-Yuan Tseng
(74) *Attorney, Agent, or Firm* — Scully Scott Murphy and Presser

(57) ABSTRACT

A technique for branch target prediction includes storing, based on an instruction fetch address for a group of fetched instructions, first predicted targets for first indirect branch instructions in respective entries of a local count cache. Second predicted targets for second indirect branch instructions are stored in respective entries of a global count cache, based on the instruction fetch address and a global history vector for the instruction fetch address. One of the local count cache and the global count cache is selected to provide a selected predicted target for an indirect branch instruction in the group of fetched instructions.

20 Claims, 6 Drawing Sheets

TECHNIQUES FOR SELECTING A PREDICTED INDIRECT BRANCH ADDRESS FROM GLOBAL AND LOCAL CACHES

BACKGROUND

The disclosure generally relates to branch prediction in a processor, and more particularly, to selecting a predicted indirect branch address. Still more specifically, the disclosure relates to techniques for selecting a predicted indirect branch address from global and local caches.

A branch instruction in an instruction sequence often involves a hazard. A conditional branch instruction in an instruction sequence is even more problematic. In this case, a processor may or may not branch, depending on a calculation that has not yet occurred. Pipelined processors may stall, may attempt branch prediction, or may execute two different program sequences (i.e., execute a first program sequence assuming a branch is 'taken' and a second program sequence assuming the branch is 'not taken'), discarding all work associated with the incorrect program sequence. A pipelined processor with a branch predictor that usually makes correct predictions can minimize the performance penalty associated with branching. However, incorrect predictions create additional processor work, such as flushing instructions corresponding to an incorrect code path from a processor pipeline before executing instructions along a correct code path.

In computer architecture, a branch predictor is usually implemented as a digital circuit that is configured to predict a path taken by a branch instruction (e.g., an if-then-else structure). The purpose of a branch predictor is to improve flow in an instruction pipeline. Branch predictors play a critical role in achieving high effective performance in many modern pipelined processor architectures. Two-way branching is usually implemented with a conditional jump instruction. A conditional jump can either be 'not taken' and continue execution with a first code branch that immediately follows a conditional jump or can be 'taken' and jump to a different place in program memory where a second code branch is stored. In general, it is uncertain whether a conditional jump will be 'taken' or 'not taken' until an associated condition has been calculated and the conditional jump has passed an execution stage in an instruction pipeline.

Without branch prediction, a pipelined processor has to wait until the conditional jump instruction passes an execute stage before a next instruction can enter a fetch stage in the pipeline. A branch predictor attempts to avoid the time delay (associated with waiting until the conditional jump instruction passes an execute stage) by predicting whether the conditional jump is most likely to be 'taken' or 'not taken'. Code from the branch that is predicted to be the most likely path is then fetched and speculatively executed. If the predicted code path is later detected to be the wrong code path, then speculatively executed or partially executed instructions are flushed from an instruction pipeline, and the pipeline is refilled with code from the correct branch, incurring a time delay. In general, the time delay attributable to branch misprediction is equal to the number of stages in the pipeline from a fetch stage to an execute stage. Modern processors tend to have relatively long pipelines, and a misprediction time delay is typically between ten to twenty clock cycles. The longer the pipeline, the greater the need for an accurate branch predictor.

Static prediction is the simplest branch prediction technique, as static prediction does not rely on information about a dynamic code execution history. That is, branch predictors employing static prediction predict an outcome of a branch instruction as 'taken' or 'not taken' based solely on the branch instruction.

Dynamic branch prediction, on the other hand, tracks whether branches are 'taken' or 'not taken'. The first time a conditional jump instruction is encountered there is essentially no information on which to base a prediction. When a branch predictor subsequently encounters a conditional jump instruction that has executed several times, the branch predictor can base a prediction on the branch history. The branch predictor may, for example, recognize that the conditional jump is 'taken' more often than 'not taken' or that the conditional jump is 'taken' every 'nth' time.

It should be appreciated that branch prediction is not the same as branch target prediction. Branch prediction (or branch direction prediction) attempts to guess whether a conditional jump will be 'taken' or 'not taken'. Branch target prediction attempts to predict an address (target) of a taken conditional or unconditional jump before the target is computed (i.e., by decoding and executing the taken conditional or unconditional jump (i.e., branch instruction)). Branch prediction and branch target prediction are often combined into the same branch prediction unit.

BRIEF SUMMARY

A technique for branch target prediction includes storing, based on an instruction fetch address for a group of fetched instructions, first predicted targets for first indirect branch instructions in respective entries of a local count cache. Second predicted targets for second indirect branch instructions are stored in respective entries of a global count cache, based on the instruction fetch address and a global history vector for the instruction fetch address. One of the local count cache and the global count cache is selected to provide a selected predicted target for an indirect branch instruction in the group of fetched instructions.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

Figure 1:
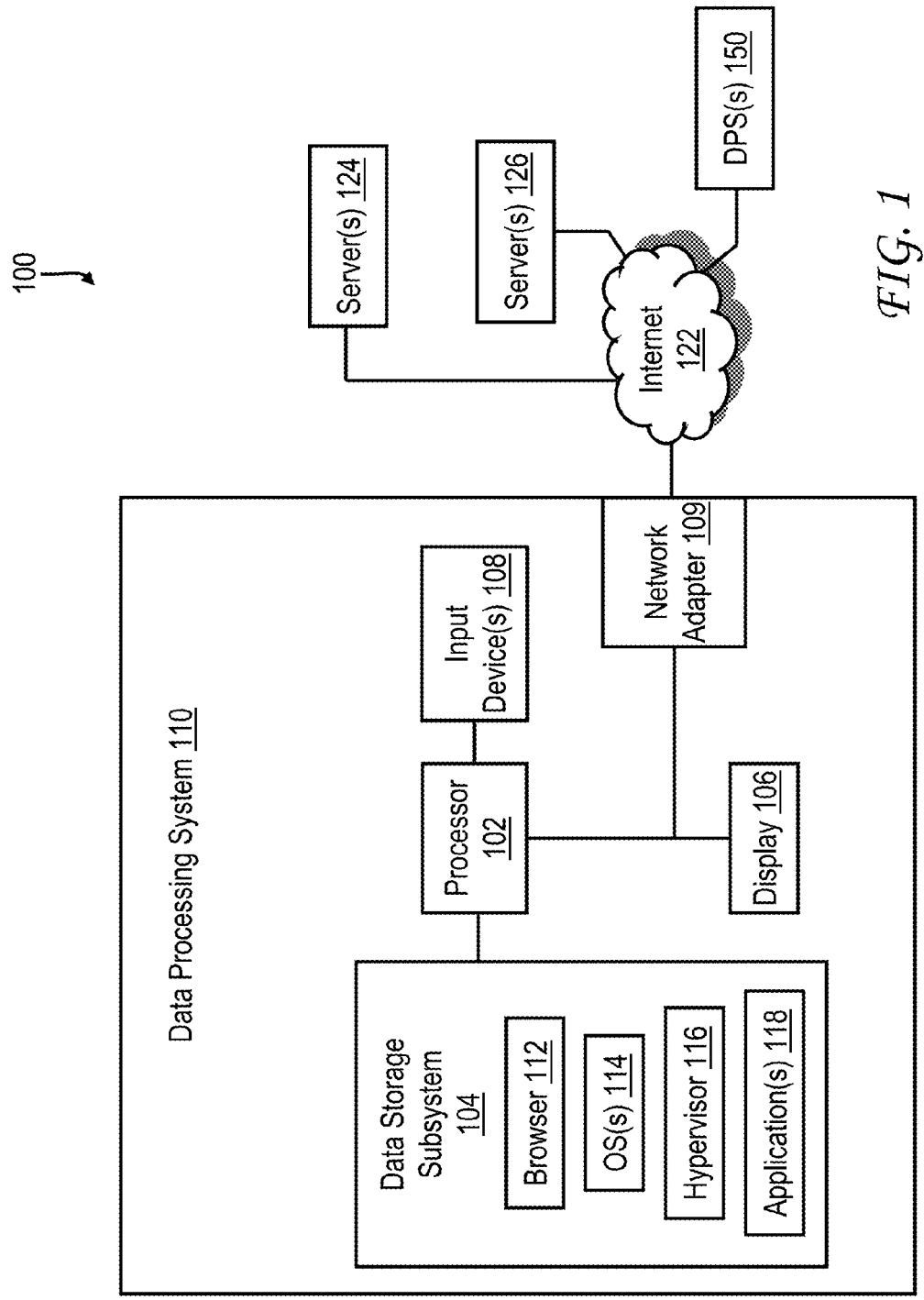
FIG. 1 is a diagram of a relevant portion of an exemplary data processing system environment that includes a data processing system that is configured to select an indirect branch address (target) from a global count cache or a local count cache according to the present disclosure.

The illustrative embodiments provide a method, a data processing system, and a processor configured to select a predicted target (address) for an indirect branch instruction from a global count cache or a local count cache.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It should be understood that the use of specific component, device, and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As used herein, the term 'coupled' may encompass a direct connection between components or elements or an indirect connection between components or elements utilizing one or more intervening components or elements.

In general, early reduced-instruction set computer (RISC) architectures used single direction static branch prediction (i.e., the early RISC architectures always predicted that a conditional jump would be 'not taken') and always fetched a next sequential instruction following a branch instruction. Only after the branch instruction was evaluated and found to be 'taken' was an instruction pointer (IP) set to a non-sequential address. Early RISC architectures evaluated branches in a decode stage and had a single-cycle instruction fetch. As a result, branch target recurrence was two cycles long and a machine would always fetch an instruction immediately after any 'taken' branch. Typical early RISC architectures defined branch delay slots in order to utilize an instruction fetched after the branch instruction.

A more complex form of static prediction assumes backwards-pointing branches are 'taken' and forward-pointing branches are 'not taken'. A backwards-pointing branch is a branch that has an address (target) that is lower than an address of the branch instruction. Backwards branch techniques can help with prediction accuracy of loops, which are usually backward-pointing branches and are 'taken' more often than 'not taken'. Static prediction is used as a fall-back technique in some pipelined processors with dynamic branch prediction when there is no available information on which a dynamic predictor can base a branch target prediction.

Some superscalar processors fetch each line of instructions with a pointer to a next line of instructions. Next-line predictors may be configured to handle branch target prediction, as well as branch direction prediction. When a next-line predictor points to aligned groups of instructions (e.g., two, four, or eight instructions), the branch target will usually not be the first instruction fetched and, as such, initial instructions fetched are usually wasted. Since a branch instruction is generally not the last instruction in an aligned group, instructions after a 'taken' branch (or its delay slot) are generally discarded. The discarded instructions at the branch and destination lines may add up to nearly a complete fetch cycle, even for a single-cycle next-line predictor. A saturating counter or bimodal predictor is a state machine with four states: strongly 'not taken'; weakly 'not taken'; weakly 'taken'; and strongly 'taken'. When a branch is evaluated, the corresponding state machine is updated. Branches evaluated as 'not taken' decrement the state machine towards strongly 'not taken' and branches evaluated as 'taken' increment the state machine towards strongly 'taken'. The advantage of a two-bit counter over a one-bit scheme is that a conditional jump has to deviate twice from what the jump has done in the most recent past before a prediction changes. For example, a loop-closing conditional jump is mispredicted once rather than twice.

A branch predictor table may be indexed with instruction address bits so that a processor can fetch a prediction for every instruction before the instruction is decoded. If there are three 'if' statements in a fetched code group, the third 'if' statement might be 'taken' depending upon whether the previous two 'if' statements were 'taken' or 'not taken'. In this scenario, a two-level adaptive predictor generally works more efficiently than a saturation counter. In general, conditional jumps that are 'taken' every 'nth' time are not predicted well by a saturation counter. In contrast, a two-level adaptive predictor remembers the history of the last 'n' occurrences of a branch instruction and uses one saturating counter for each of the possible $2^n$ history patterns. Assuming 'n' is equal to two, the last two occurrences of a branch are stored in a 2-bit branch history register, which can have four different binary values, i.e., '00', '01', '10', and '11' (where '0' means 'not taken' and '1' means 'taken'). In this case, a pattern history table includes four entries, i.e., one entry for each of the four ($2^n$, where 'n' is equal to two) possible branch histories, and each entry in the pattern history table includes a 2-bit saturation counter.

A branch history register is used for selecting which of the four saturation counters to use. If the history is '00', then the first counter is used. If the history is '11', then the last of the four counters is used. Assuming, for example, that a conditional jump is taken every third time (i.e., the branch sequence is 001001001 . . . ), entry number '00' in the pattern history table goes to the state strongly 'taken', indicating that after two zeroes comes a one. Entry number '01' goes to the state strongly 'not taken', indicating that a '0' comes after '01'. Similarly, entry number '10' goes to the state strongly 'not taken', indicating that '0' comes after '10' and entry number '11' is never used because there are never two consecutive ones. The general rule for a two-level adaptive predictor with an n-bit history is that it can predict any repetitive sequence with any period if all n-bit subsequences are different. The advantage of the two-level adaptive predictor is that it can quickly learn to predict arbitrary repetitive patterns.

A local branch predictor has a separate history buffer for each conditional jump instruction and may use a two-level adaptive predictor. The history buffer for a local branch predictor is separate for each conditional jump instruction, while the pattern history table may be separate or may be shared between all conditional jumps. A global branch predictor does not maintain a separate history record for each conditional jump. That is, a global branch predictor maintains a shared history of all conditional jumps. The advantage of a shared history is that any correlation between different conditional jumps is included in making predictions. The disadvantage of a shared history is that the history is diluted by irrelevant information if the different conditional jumps are uncorrelated, and the history buffer may not include any bits from the same branch if there are many other branches in between. A global branch predictor may use a two-level adaptive predictor, but the scheme is usually only better than the saturation counter scheme for large table sizes and is rarely as good as local prediction. In general, the history buffer for a global branch predictor must be longer in order to make a good prediction and a size of the pattern history table grows exponentially with the size of the history buffer. As such, a large pattern history table is usually shared among all conditional jumps.

A two-level adaptive predictor with a globally shared history buffer and a pattern history table are typically referred to as a 'gshare' predictor if the predictor exclusive ORs (XORs) the global history and branch program counter (PC) and is referred to as a 'gselect' predictor if the predictor concatenates the global history and the branch PC. An alloyed branch predictor combines the local and global prediction principles by concatenating local and global branch histories, possibly with some bits from the PC. An agree predictor is a two-level adaptive predictor with globally shared history buffer and pattern history table and an additional local saturation counter. The outputs of the local and the global predictors are XOR'd with each other to provide a final prediction. The purpose of the agree predictor is to reduce contentions in a pattern history table where two branches with opposite predictions share the same entry in the pattern history table.

A hybrid predictor (also know as a combined predictor) implements more than one prediction mechanism. A final prediction of a hybrid predictor is based either on a meta-predictor that remembers which of the predictors has made the best predictions in the past or a majority vote function based on an odd number of different predictors. Predictors like 'gshare' predictors use multiple table entries to track the behavior of any particular branch. The multiplication of entries makes it more likely that two branches map to the same table entry (a situation called aliasing), which, in turn, makes it more likely that prediction accuracy will suffer for those branches. When multiple predictors are employed, it is generally beneficial to arrange the multiple predictors such that each of the predictors has different aliasing patterns so that it is more likely that at least one of the predictors does not experience aliasing. Combined predictors with different indexing functions for the different predictors are generally referred to as 'gskew' predictors and are analogous to skewed associative caches used for data and instruction caching.

A conditional jump that controls a loop is best predicted with a special loop predictor. A conditional jump in the bottom of a loop that repeats N times will be 'taken' N−1 times and then 'not taken' once. If the conditional jump is placed at the top of the loop, it will be 'not taken' N−1 times and then 'taken' once. A conditional jump that goes many times one way and then the other way once is detected as having loop behavior. In general, behavior of conditional jumps can be readily predicted using a simple counter. A loop predictor may be part of a hybrid predictor in which a meta-predictor detects whether the conditional jump has loop behavior. An indirect jump instruction may choose between more than two branches. Some processors can predict indirect branches by using a two-level adaptive predictor. However, indirect branch instructions usually contribute more than one bit to the history buffer. Processors without a two-level adaptive predictor simply predict an indirect jump to go to a same target as the jump did last execution. In general, functions normally return to where the functions were called. A return instruction is an indirect jump that reads a target from a call stack. Many processors have a separate prediction mechanism for return instructions. The trade-off between fast branch prediction and good branch prediction is sometimes dealt with by having two branch predictors. In this case, a first branch predictor is fast and simple, and a second branch predictor is usually slower, more complicated, includes larger tables, and is configured to override a possibly wrong prediction made by the first branch predictor.

As mentioned above, a branch target predictor is the part of a pipelined processor that predicts a target of a 'taken' branch instruction (i.e., a conditional branch or an unconditional branch instruction) before a target of the branch instruction is computed by an execution unit of the processor. As noted above, branch target prediction is not the same as branch direction prediction. Branch direction prediction attempts to guess whether a conditional branch will be 'taken' or 'not taken' (i.e., sequential code execution). In many parallel processor designs, as an instruction cache latency grows longer and a fetch width grows wider, branch target extraction becomes a bottleneck. The recurrence is: a group of instructions are fetched from an instruction cache; instructions in the group are scanned to identify branches; a first predicted 'taken' branch is identified; an address (target) of the first predicted 'taken' branch is computed; and instructions are then fetched at the target.

In machines where the recurrence takes two cycles, the machine loses one full fetch cycle after every predicted 'taken' branch. As predicted branches usually occur about every ten instructions, a substantial drop in fetch bandwidth can occur. To address the drop in fetch bandwidth, some machines implement branch target prediction (i.e., given a branch instruction, predict a target of the branch instruction). A refinement of the idea predicts the start of a sequential run of instructions given the address of the start of the previous sequential run of instructions. In general, a branch target predictor reduces the above recurrence to: hash the address of the first instruction in an instruction group; fetch the prediction for the addresses of the targets of branches in the instruction group; and select the address corresponding to the branch predicted 'taken'. In general, as a predictor cache is substantially smaller than an instruction cache, the predictor cache fetch is faster than the instruction cache fetch. If the predictor cache fetch is not fast enough, predictor cache fetches can be parallelized by predicting targets of target branches.

As one example, the POWER7® processor available from International Business Machines Corporation uses different mechanisms to predict a branch direction ('taken' or 'not taken') and a branch target. In various implementations, the POWER7 processor employs an instruction fetch unit (IFU) that supports a three-cycle branch scan loop (to scan an instruction group for branches 'taken', compute targets, and determine if a branch instruction is an unconditional branch or a 'taken' branch). In the POWER7 processor, a branch direction predictor is employed that implements an 8K entry local branch history table (LBHT), a 16K entry global branch history table (GBHT) and an 8K entry global selection (GSEL) array. The LBHT, GBHT, and GSEL arrays provide branch direction predictions for all instructions in a fetch group (that may included up to eight instructions). In the POWER7 processor, the LBHT, GBHT, and GSEL arrays are shared by all threads. The LBHT is directly indexed by ten bits from an instruction fetch address provided by an instruction fetch address register (IFAR). The GBHT and GSEL arrays are indexed by the instruction fetch address hashed with a 21-bit global history vector (GHV) reduced down to eleven bits, i.e., one bit per allowed thread. The value in the GSEL chooses between LBHT and GBHT for the direction of the prediction of each individual branch.

In the POWER7 processor, each BHT (LBHT and GBHT) entry contains two bits, with a higher-order bit determining a direction ('taken' or 'not taken') and a lower-order bit providing hysteresis (i.e., a history of the branch instruction). In a POWER7 implementation, a branch target may be predicted in two ways. Indirect branches that are not subroutine returns use a 128-entry count cache that is shared by all active threads. The count cache is indexed by performing an XOR of seven bits from the instruction fetch address and the GHV. Each entry in the count cache includes a 62-bit predicted address with two confidence bits. Subroutine returns are predicted using a link stack (one per thread), which is similar to a return address stack (RAS).

In general, indirect branches are branch instructions that are based on a register value. Since a branch target is based on a register value, the target is not known until late in a processor pipeline. Given that a target of an indirect branch is not known until late in a processor pipeline, in order to optimize performance of the processor pipeline the target may be predicted based on a count cache structure. The software trends of object-oriented coding and interpretive languages have made accurate indirect target prediction increasingly desirable.

Known pipelined processor designs have utilized various indices into a count cache in order to predict a target of an indirect branch instruction. For POWER7 implementations, an index into a count cache is based on an XOR of a global history vector (GHV) value and an instruction fetch address register (IFAR) value. In general, a GHV value is different if a path leading up to a branch is different. Typically, a path leading up to a branch is well correlated with which target should be selected. There are certain indirect branches that always go to a same target. For indirect branches that always go to a same target, employing the GHV to determine a target reduces performance in at least two ways. For example, when there are multiple paths to a branch, each path requires value initialization in the count cache. In this case, extra address mispredictions are made before all the paths are established in the count cache. As another example, a branch that is reached by multiple paths takes up multiple entries in the count cache and if there are other branches that are path dependent, then the path dependent branches may alias to the same count cache entries, reducing prediction accuracy of the path dependent branches.

According to the present disclosure, techniques are disclosed that generally improve count cache prediction for a pipelined processor. In one or more embodiments, two count caches, i.e., a local count cache (LCC) and a global count cache (GCC) are implemented. In at least one embodiment, the LCC is indexed based on an instruction fetch address register (IFAR) value, and the GCC is indexed based on a global history vector (GHV) XOR'd with the IFAR value. In various embodiments, the LCC and the GCC maintain a separate confidence count that is used to determine if the respective entries in the LCC and the GCC should be replaced. In one or more embodiments, the confidence count is maintained with an up/down saturation counter that is incremented when the count cache result is useful and is decremented when the count cache provides an incorrect prediction. In at least one embodiment, when a new count cache entry is installed in the LCC or the GCC, the confidence count is set to a value that allows for the new count cache entry to be wrong at least once. When the confidence count falls below some threshold and there is a target misprediction for a branch that indexed the entry, a new target may be installed (in the entry with the target misprediction) in the LCC and/or the GCC.

The selection of which count cache provides a predicted target may also be based on an up/down counter. As one example, when a select bit is set to '1' the LCC entry may be selected to provide a predicted target, and when the select bit is set to a '0' the GCC entry may be selected to provide a predicted target. In one or more embodiments, when the LCC entry provides a correct target or neither the LCC entry nor the GCC entry provide the correct target, the select bit is set to '1' or remains at '1'. When the LCC entry provides an incorrect target and the GCC entry provides the correct target, the select bit is set to '0' or remains at '0'. In one or more embodiments, the update of the GCC is suppressed when the LCC is selected and the confidence count of the LCC is strong (e.g., above '010' for a three bit counter). Suppressing the update of the GCC when the LCC is selected and the confidence count of the LCC is strong generally reduces pollution of the GCC for indirect branches that always go the same target. In general, targets that are designated by multiple paths should be entered into the GCC (not the LCC) and targets for indirect branches that always go to a same target should be entered in the LCC (not the GCC).

With reference to FIG. 1, an exemplary data processing environment 100 is illustrated that includes a data processing system 110 that is configured, according to one or more embodiments of the present disclosure, to select a target (address) for an indirect branch instruction from a global count cache (GCC) or a local count cache (LCC). Data processing system 110 may take various forms, such as workstations, laptop computer systems, notebook computer systems, desktop computer systems or servers and/or clusters thereof. Data processing system 110 includes one or more processors 102 (which may include one or more processor cores for executing program code) coupled to a data storage subsystem 104, optionally a display 106, one or more input devices 108, and a network adapter 109. Data storage subsystem 104 may include, for example, application appropriate amounts of various memories (e.g., dynamic random access memory (DRAM), static RAM (SRAM), and read-only memory (ROM)), and/or one or more mass storage devices, such as magnetic or optical disk drives.

Data storage subsystem 104 includes one or more operating systems (OSs) 114 for data processing system 110. Data storage subsystem 104 also includes application programs, such as a browser 112 (which may optionally include customized plug-ins to support various client applications), a hypervisor (or virtual machine monitor (VMM)) 116 for managing one or more virtual machines (VMs) as instantiated by different OS images, and other applications (e.g., a word processing application, a presentation application, and an email application) 118.

Display 106 may be, for example, a cathode ray tube (CRT) or a liquid crystal display (LCD). Input device(s) 108 of data processing system 110 may include, for example, a mouse, a keyboard, haptic devices, and/or a touch screen. Network adapter 109 supports communication of data processing system 110 with one or more wired and/or wireless networks utilizing one or more communication protocols, such as 802.x, HTTP, simple mail transfer protocol (SMTP), etc. Data processing system 110 is shown coupled via one or more wired or wireless networks, such as the Internet 122, to various file servers 124 and various web page servers 126 that provide information of interest to the user of data processing system 110. Data processing environment 100 also includes one or more data processing systems 150 that are configured in a similar manner as data processing system 110. In general, data processing systems 150 represent data processing systems that are remote to data processing system 110 and that may execute OS images that may be linked to one or more OS images executing on data processing system 110.

Those of ordinary skill in the art will appreciate that the hardware components and basic configuration depicted in FIG. 1 may vary. The illustrative components within data processing system 110 are not intended to be exhaustive, but rather are representative to highlight components that may be utilized to implement the present invention. For example, other devices/components may be used in addition to or in place of the hardware depicted. The depicted example is not meant to imply architectural or other limitations with respect to the presently described embodiments.

Figure 2:
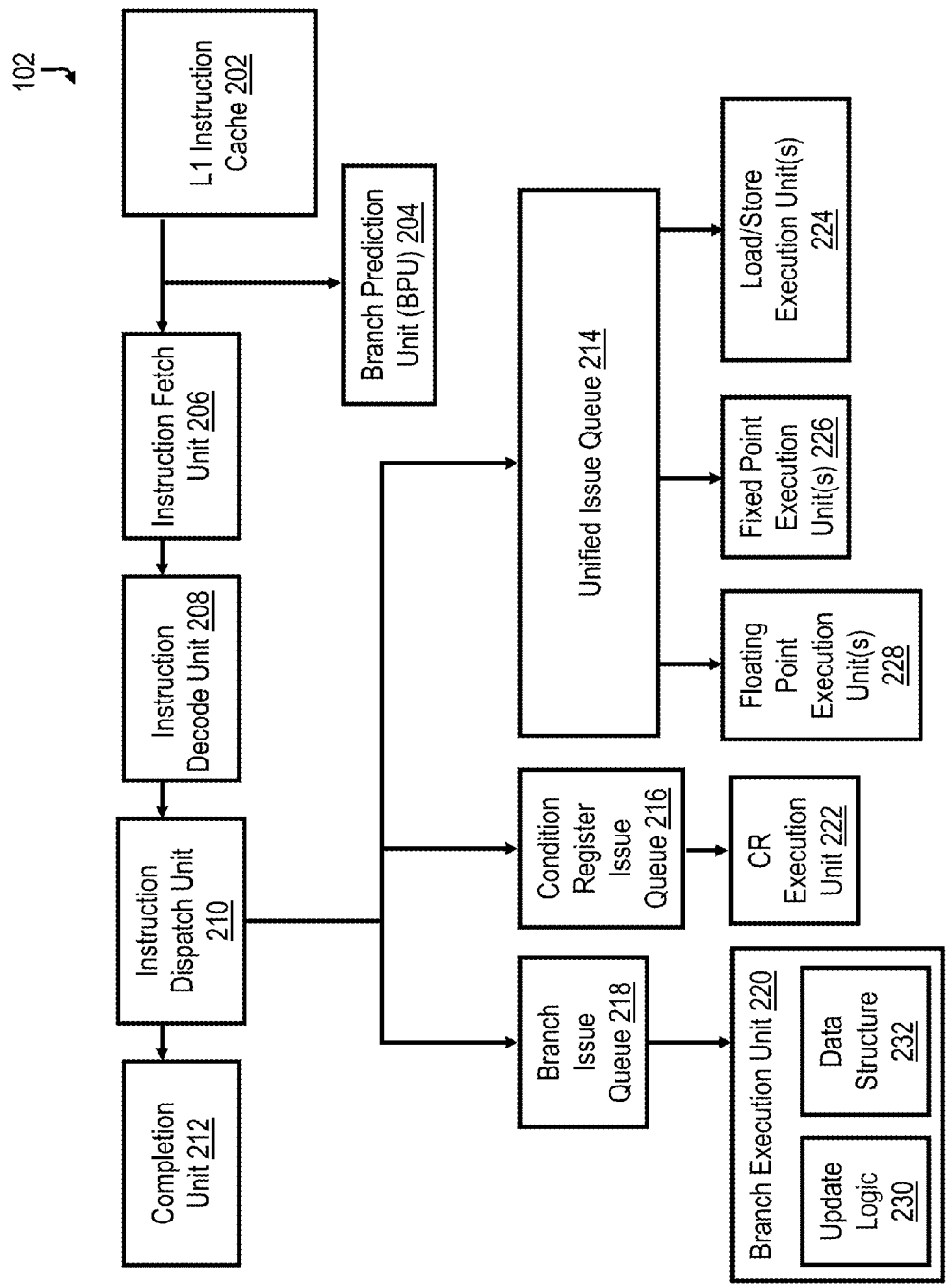
FIG. 2 is a diagram of a relevant portion of a processor pipeline of the data processing system of FIG. 1.

With reference to FIG. 2, relevant components of processor 102 are illustrated in additional detail. Processor 102 includes a level 1 (L1) instruction cache 202 from which instruction fetch unit (IFU) 206 fetches instructions. IFU 206 may support a multi-cycle (e.g., three-cycle) branch scan loop to facilitate scanning a fetched instruction group for branch instructions predicted 'taken', computing targets of the predicted 'taken' branches, and determining if a branch instruction is an unconditional branch or a 'taken' branch. Fetched instructions are also provided to branch prediction unit (BPU) 204, which predicts whether a branch is 'taken' or 'not taken' and a target of predicted 'taken' branches.

In one or more embodiments, BPU 204 includes a branch direction predictor that implements a local branch history table (LBHT) array, global branch history table (GBHT) array, and a global selection (GSEL) array. The LBHT, GBHT, and GSEL arrays (not shown) provide branch direction predictions for all instructions in a fetch group (that may include up to eight instructions). The LBHT, GBHT, and GSEL arrays are shared by all threads. The LBHT array may be directly indexed by bits (e.g., ten bits) from an instruction fetch address provided by an instruction fetch address register (IFAR). The GBHT and GSEL arrays may be indexed by the instruction fetch address hashed with a global history vector (GHV) (e.g., a 21-bit GHV reduced down to eleven bits, which provides one bit per allowed thread). The value in the GSEL may be employed to select between the LBHT and GBHT arrays for the direction of the prediction of each individual branch. BPU 204 also provides a branch target predictor, which is illustrated and discussed in further detail with reference to FIG. 3.

IFU 206 provides fetched instruction to instruction decode unit (IDU) 208 for decoding. IDU 208 provides decoded instructions to instruction dispatch unit 210 for dispatch. Following execution of dispatched instructions, instruction dispatch unit 210 provides the results of the executed dispatched instructions to completion unit 212. Depending on the type of instruction, a dispatched instruction is provided to branch issue queue 218, condition register (CR) issue queue 216, or unified issue queue 214 for execution in an appropriate execution unit. Branch issue queue 218 stores dispatched branch instructions for branch execution unit 220. CR issue queue 216 stores dispatched CR instructions for CR execution unit 222. Unified issued queue 214 stores instructions for floating point execution unit(s) 228, fixed point execution unit(s) 226, load/store execution unit(s) 224, among other execution units.

Figure 3:
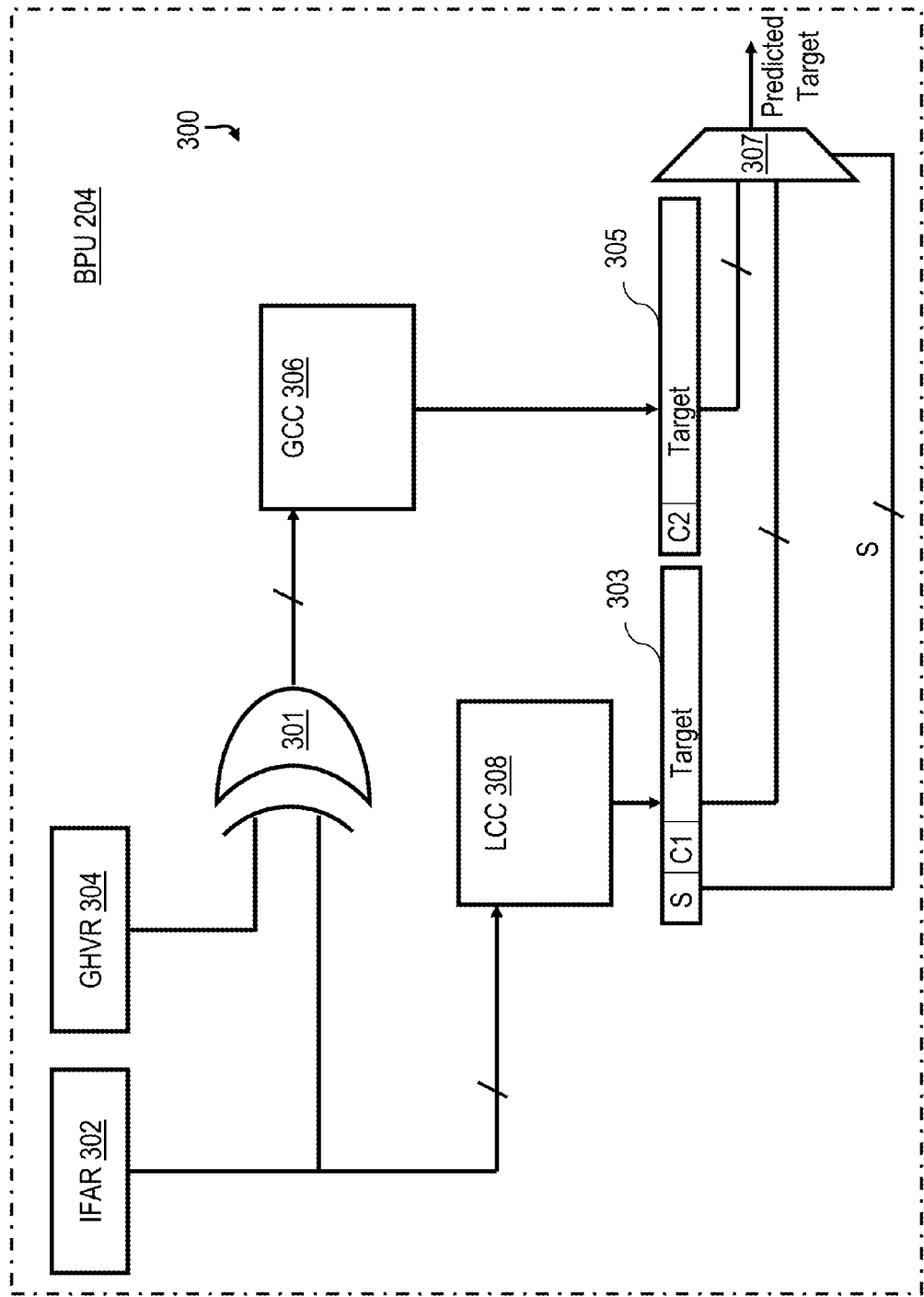
FIG. 3 is a diagram of a relevant portion of a selection circuit that is configured to select an indirect address for an indirect branch instruction from a local count cache (LCC) or a global count cache (GCC) according to an embodiment of the present disclosure.

With reference to FIG. 3, branch target prediction circuit 300 (e.g., implemented in BPU 204) includes an instruction fetch address register (IFAR) 302 that stores an address for a currently fetched instruction group and a global history vector register (GHVR) 304 that stores global history vectors (GHVs) for addresses that have been loaded into IFAR register 302. That is, GHVR 304 stores a sequence of ones and zeroes that indicate whether a branch in an instruction group (pointed to by the address in IFAR 302) was 'taken' or 'not taken' during prior fetches of the instruction group. In one or more embodiments, when any branch in an instruction group is 'taken', a '1' is shifted into an associated entry for the address in GHVR 304. Similarly, when all branches in an instruction group are 'not taken', a '0' is shifted into an associated entry for the address in GHVR 304. For example, each entry in GHVR 304 may hold twenty bits. In general, a GHV value is different if a path leading up to a branch is different.

Typically, a path leading up to a branch is well correlated with which target should be selected. For indirect branches that always go to a same target, employing a GHV to determine a target reduces performance in at least two ways. As previously mentioned, when there are multiple paths to a branch, each path requires value initialization in a count cache. In this case, there are extra address mispredictions before all the paths are set-up in the count cache. As another example, a branch that is reached by multiple paths takes up multiple entries in the count cache and if there are other branches that are path dependent, then the path dependent branches may alias to the same count cache entries reducing prediction accuracy of the path dependent branches.

According to the present disclosure, techniques are disclosed that generally improve count cache prediction for a pipelined processor. In one or more embodiments, two count caches, i.e., a local count cache (LCC) 308 and a global count cache (GCC) 306 are implemented. As is illustrated, LCC 308 is addressed based on an IFAR 302 value, and GCC 306 is addressed based on a GHV that is exclusive OR'd (using XOR gate 301) with the value in IFAR 302. In various embodiments, LCC 308 and GCC 306 maintain respective confidence counts ('C1' and 'C2') that are used (at least in part) to determine if respective entries in LCC 308 and GCC 306 should be replaced. LCC 308 and GCC 306 may, for example, each include two hundred fifty-six (256) entries. In the case that LCC 308 and GCC 306 each include two hundred fifty-six entries, eight bits are required to index one of the entries. In one or more embodiments, the confidence counts ('C1' and 'C2') are maintained with respective up/down saturation counters that are incremented when a count cache result is useful and are decremented when the count cache provides an incorrect target prediction. In at least one embodiment, when a new count cache entry (i.e., a new target) is installed in LCC 308 and/or GCC 306, the corresponding confidence count is set to a value that allows for the target to be wrong at least once. In one or more embodiments, when the confidence count falls below some threshold and there is a target misprediction for a branch that indexed the entry, a new target is installed (in the entry with the target misprediction) in LCC 308 and/or GCC 306.

The count cache (i.e., LCC 308 or GCC 306) that provides a target may also be selected based on an up/down counter. As is illustrated, a local count cache register 303 provides a first target (provided by LCC 308) to a first input of multiplexer 307 and a select signal (select signal 'S') to a select input of multiplexer 307. Global count cache register 305 provides a second target (provided by GCC 306) to a second input of multiplexer 307. Select signal 'S', which in the illustrated embodiment is generated from a selector bit in the entry of LCC 308 copied into local count cache register 303, selects whether a target provided by local count cache register 303 or a target provided by global count cache register 305 is provided at an output of multiplexer 307.

The selector bit may be updated if a predicted target is incorrect. For example, if the target predicted by LCC 308 is selected and is incorrect and a target predicted by GCC 306 is correct, the selector bit may be updated in the relevant entry of LCC 308 to select GCC 306 rather than LCC 308 as the source of a subsequently predicted target. Similarly, if the target predicted by GCC 306 is selected and is incorrect and a target predicted by LCC 308 is correct, the selector bit in the relevant entry of LCC 308 may be updated to select LCC 308 rather than GCC 306 as the source of a subsequently predicted target. In one or more embodiments, if predicted targets from LCC 308 and GCC 306 are both correct or both incorrect the selector bit is not updated. In one or more embodiments, the update of an entry in GCC 306 is suppressed when a target from LCC 308 is selected and the confidence count of LCC 308 is strong. Suppressing the update of GCC 306 when a target from LCC 308 is correct and the confidence count of LCC 308 is strong generally reduces pollution of GCC 306 for indirect branches that always go the same target.

Figure 4:
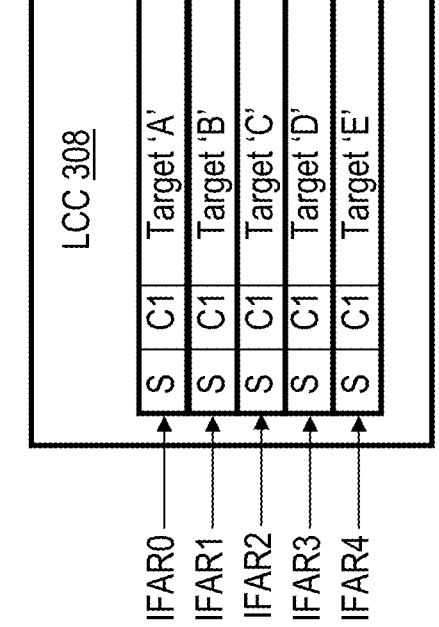
FIG. 4 is a diagram of a relevant portion of multiple exemplary entries in an LCC configured according to one embodiment of the present disclosure.

With reference to FIG. 4, LCC 308 is illustrated as storing five entries with different targets (i.e., target A, target B, target C, target D, and target E) that are selected with different IFAR values (i.e., IFAR0, IFAR1, IFAR2, IFAR3, and IFAR4, respectively). It should be appreciated that an LCC configured according to the present disclosure may include more or less than five entries. For example, an LCC configured according to the present disclosure may store two hundred fifty-six (256) entries.

Figure 5:
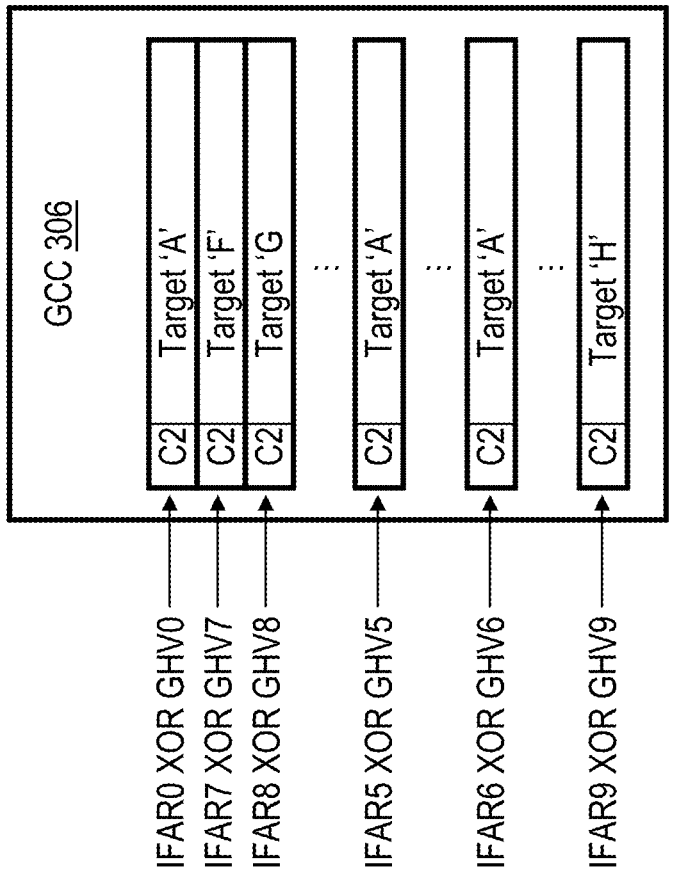
FIG. 5 is a diagram of a relevant portion of multiple exemplary entries in a GCC configured according to one embodiment of the present disclosure.

With reference to FIG. 5, GCC 306 is illustrated as storing six entries with some repeated targets (i.e., target A) and some different targets (i.e., target F, target G, and target H) that are indexed with different IFAR values XOR'd with different GHVs (i.e., IFAR0 XOR GHV0, IFAR7 XOR GHV7, IFAR8 XOR GHV8, IFAR5 XOR GHV5, IFAR6 XOR GHV6, and IFAR9 XOR GHV9). It should be noted that target A occupies three entries that are indexed with different indices (i.e., IFAR0 XOR GHV0, IFAR5 XOR GHV5, and IFAR6 XOR GHV6). These three entries thus represent a common target prediction shared by multiple different code paths. It should be appreciated that a GCC configured according to the present disclosure may include more or less than six entries. For example, a GCC configured according to the present disclosure may store two hundred fifty-six (256) entries.

As shown in FIG. 2, branch execution unit 220 can include update logic 230, which is configured to update counts 'C1' and 'C2' in the entries of LCC 308 and GCC 306, respectively. As noted above, in various embodiments, LCC 308 and GCC 306 maintain respective confidence counts ('C1' and 'C2') that are used to determine if respective entries in LCC 308 and GCC 306 should be replaced. In one or more embodiments, the confidence counts are maintained with respective up/down saturation counters (not shown) that are incremented when a count cache provides a correct target prediction and are decremented when a count cache provides an incorrect target prediction. In at least one embodiment, when a new count cache entry (i.e., a new target) is installed in LCC 308 and/or GCC 306, the confidence count is set to a value that allows for the target to be wrong at least once. When the confidence count falls below some threshold (e.g., '01' for a two-bit counter) and there is a target misprediction for a branch that indexed the entry, a new target is installed (in the entry with the target misprediction) in LCC 308 and/or GCC 306. It should be appreciated that update logic 230 may be located in a different unit of processor 102. For example, update logic 230 may be located in completion unit 212, and entries in LCC 308 and/or GCC 306 may be updated at completion time. As is also illustrated, a data structure 232 is implemented to store predicted targets that may later be stored in LCC 308 and/or GCC 306, depending on whether the predicted targets are correct. Data structure 232 may take the form of, for example, an effective address table (EAT).

Figure 6:
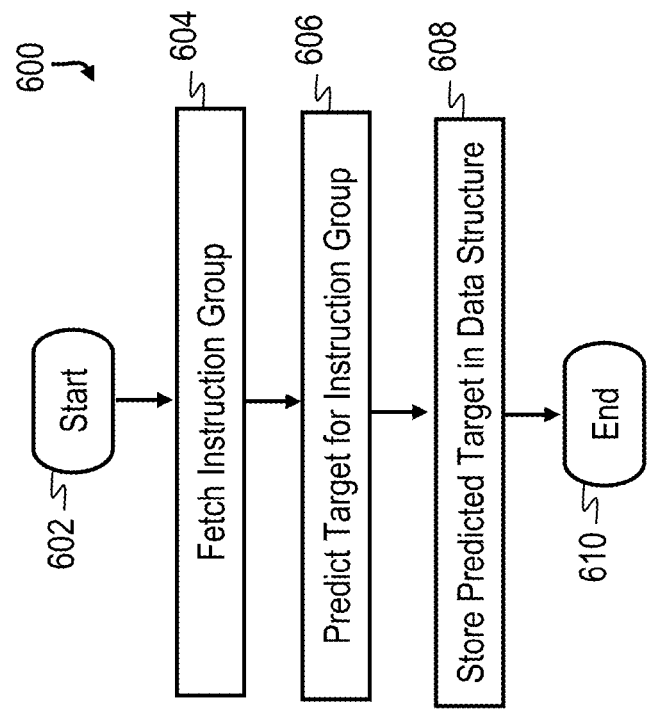
FIG. 6 is a flowchart of an exemplary process for storing predicted indirect branch targets in a data structure (e.g., an effective address table) of FIG. 2 according to one embodiment of the present disclosure.

With reference to FIG. 6, a process 600 is illustrated that is initiated in block 602 each time IFU 206 is instructed to fetch a new instruction group from L1 instruction cache 202. Next, in block 604, a new instruction group is fetched from L1 instruction cache 202 by IFU 206. Then, in block 606 branch prediction unit 204 predicts a target for the fetched instruction group. Next, in block 608, branch prediction unit 204 stores a predicted target in data structure 232 so that the predicted target may be tracked. In the event that the predicted target is correct following execution of the fetched instruction group, the predicted target may then be stored in GCC 306 and/or LCC 308. In an alternative embodiment, data structure 232 may be omitted and predicted targets may be immediately stored in GCC 306 and/or LCC 308 prior to determining whether the predicted target was correct.

First predicted targets for first indirect branch instructions may be stored in respective entries of LCC 308 based on an instruction fetch address. Second predicted targets for second indirect branch instructions may be stored in respective entries of GCC 306 based on an instruction fetch address and a global history vector (stored in global history vector register (GHVR) 304) for the instruction fetch address. In general, indirect branch targets designated by multiple paths should be stored in GCC 306, and indirect branch targets that always go to a same target should be stored in LCC 308. Following block 608, process 600 terminates in block 610 until a next instruction group is fetched by IFU 206.

Figure 7:
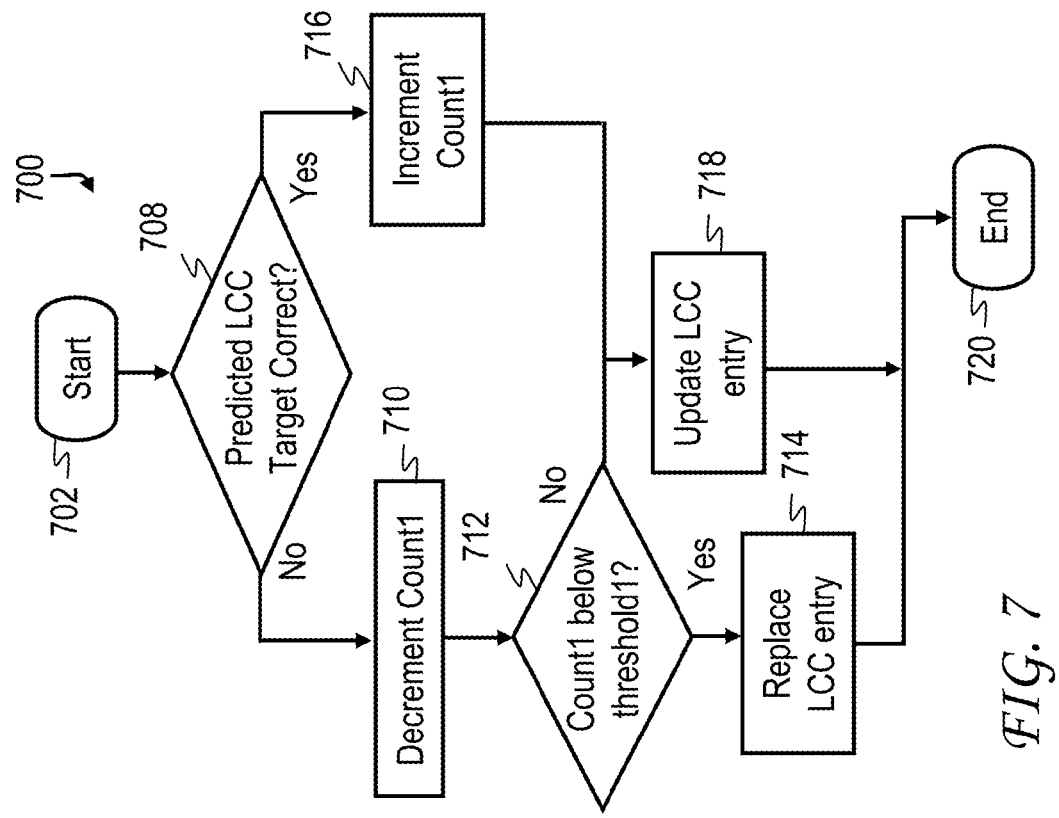
FIG. 7 is a flowchart of an exemplary process for updating entries in the LCC of FIG. 3 according to one embodiment of the present disclosure.
Figure 8:
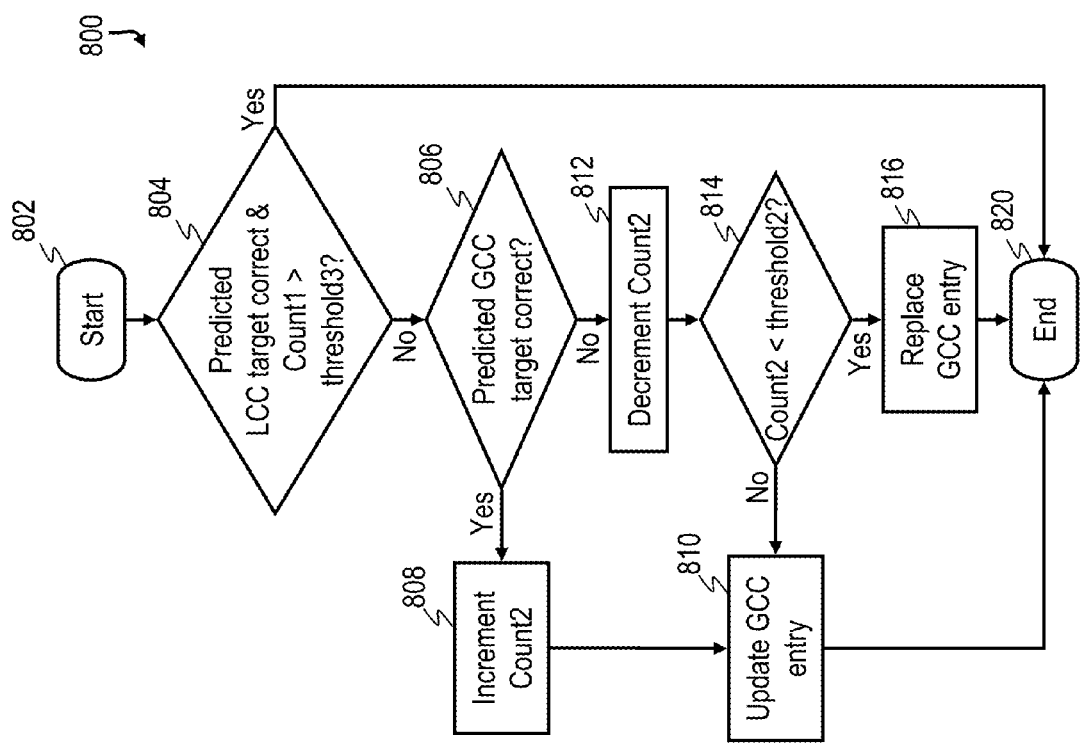
FIG. 8 is a flowchart of an exemplary process for updating entries in the GCC of FIG. 3 according to one embodiment of the present disclosure.

With reference to FIG. 7, an exemplary update process 700 for LCC 308 is illustrated that may be implemented by processor 102. FIGS. 7 and 8 are described in conjunction with FIG. 3 to facilitate better understanding. It should be appreciated that a target of a branch instruction must be known prior to updating entries in LCC 308 and/or GCC 306. Entries in LCC 308 and/or GCC 306 may be updated following, for example, execution or completion. In order to determine if a predicted target is correct following execution of a fetched instruction group, the predicted target may be temporarily saved in, for example, data structure 232 (which may take the form of an effective address table (EAT)). In lieu of storing all address bits, some subset of the address bits may be stored. For example, instead of storing sixty-four address bits an implementation may only store four bits that are derived from XORing EA(0:3), EA(4:7), EA(8:11), etc.

Processor 102 may employ various logic in performing the blocks of process 700. Process 700 may, for example, be initiated (in block 702) following execution or completion of an instruction group. In one or more embodiments, processor 102 selects an entry (as a predicted target) from LCC 308 based on the instruction fetch address for the group of fetched instructions. Processor 102 may store a first predicted target (from the selected entry in LCC 308) in an associated local count cache register 303. In one or more embodiments, processor 102 selects an entry (as a predicted target) from GCC 306 based on the instruction fetch address and the global history vector. Processor 102 may store a second predicted target (from the selected entry in GCC 306) in an associated global count cache register 305. In various embodiments, processor 102 selects one of local count cache register 303 and global count cache register 305 to provide a selected predicted target based on a selector bit associated with the first predicted target in LCC 308.

For example, if the selector bit is a one (1) an entry from LCC 308 is selected, and if the selector bit is a zero (0) an entry from GCC 306 is selected. Alternatively, the selector bit may be associated with the second predicted target in GCC 306. In an alternative embodiment, the selector bit may be implemented as a selector (e.g., saturation counter) that is updated to move the selector toward a count cache (i.e., a selected one of a LCC 308 and a GCC 306) that provides a selected predicted target that is correct. In this embodiment, the selector is: updated to move the selector toward a non-selected predicted target when a selected predicted target is incorrect and the non-selected predicted target is correct; updated to move the selector toward the selected predicted target when the selected predicted target is correct and the non-selected predicted target is incorrect; and maintained when the selected predicted target and the non-selected predicted target are both correct or when the selected predicted target and the non-selected predicted target are both incorrect.

Following execution of an indirect branch, processor 102 selects an entry in LCC 308 to update when the counter for an entry in LCC 308 is not saturated. For example, if LCC 308 is not selected (by the selector bit) or LCC 308 does not have high confidence then both LCC 308 and GCC 306 (see FIG. 8 for GCC 306) are updated. While the update paths for LCC 308 and GCC 306 are discussed separately in FIGS. 7 and 8, respectively, it should be appreciated that at least portions of the updates for LCC 308 and GCC 306 can be performed concurrently. Assuming an entry in LCC 308 is selected for updating, process 700 is initiated in block 702 at which point control transfers to decision block 708. In block 708 processor 102 determines whether a predicted LCC target is correct following execution of the indirect branch instruction. In response to the predicted LCC target being the correct target in block 708, control transfers to block 716 where processor 102 increments a first count (Count1 or 'C1').

Next, in block 718 the entry in LCC 308 is updated. Following block 718 control transfers to block 720 where process 700 terminates. In response to the predicted LCC target not being the correct target in block 708, control transfers to block 710 where processor 102 decrements the first count. Next, in block 712, processor 102 determines whether Count1 is below a first threshold (threshold1), e.g., '10' for a two bit counter. In response to Count1 not being below the first threshold in block 712, control transfers to block 718. In response to Count1 being below the first threshold in block 712, control transfers to block 714, where processor 102 replaces the entry in LCC 308, and then to block 720.

With reference to FIG. 8, a process 800 is illustrated for updating an entry in GCC 306. Process 800 is initiated in block 802 at which point control to decision block 804. In block 804 processor 102 determines whether the predicted LCC target was correct and whether Count1 was above a GCC update threshold (e.g., '10' for a two-bit counter). In response to the predicted LCC target being correct and Count1 being above the GCC update threshold (threshold3) in block 804, control transfers to block 820 where process 800 terminates. In this case, the entry for GCC 306 is not updated as doing so would generally cause pollution of GCC 306. In response to the predicted LCC target not being correct following execution of the indirect branch instruction or Count1 not being above the GCC update threshold in block 804, control transfers from block 804 to decision block 806.

In block 806, processor 102 determines whether a predicted GCC target is correct. In response to the predicted GCC target being correct, control transfers from block 806 to block 808, which illustrates processor 102 incrementing a second count (Count2 or 'C2'). Next, in block 810 processor 102 updates the entry in GCC 306. Following block 810, control transfers to block 820. In response to the predicted GCC target not being correct in block 806, control transfers to block 812 where processor 102 decrements Count2. Next, in decision block 814 processor 102 determines whether Count2 is below a second threshold (e.g., '10' for a two-bit counter). In response to Count2 being below the second threshold in block 814 control transfers to block 810 where the entry is updated in GCC 306. Following block 810 control transfers to block 820. In response to Count2 not being below the second threshold in block 814 control transfers to block 816, where processor 102 replaces the entry in GCC 306. Following block 816, control transfers to block 820.

Accordingly, techniques have been disclosed herein that select a predicted target (address) for an indirect branch instruction from a global count cache or a local count cache.

In the flow charts above, the methods depicted in FIGS. 6-8 may be embodied in a computer-readable medium containing computer-readable code such that a series of steps are performed when the computer-readable code is executed on a computing device. In some implementations, certain steps of the methods may be combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing, but does not include a computer-readable signal medium. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible storage medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage subsystems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of branch target prediction, comprising:
    storing, based on an instruction fetch address for a group of fetched instructions, first predicted targets for first indirect branch instructions in respective entries of a local count cache;
    storing, based on the instruction fetch address and a global history vector for the instruction fetch address, second predicted targets for second indirect branch instructions in respective entries of a global count cache; and
    selecting one of the local count cache and the global count cache to provide a selected predicted target for an indirect branch instruction in the group of fetched instructions;
    wherein the selecting one of the local count cache and the global count cache to provide the selected predicted target is based on a selector associated with one of the first and second predicted targets;
    the method further comprising:
        updating the selector to move the selector toward the selected predicted target when a non-selected predicted target is incorrect and the selected predicted target is correct;
        updating the selector to move the selector toward the non-selected predicted target when the selected predicted target is incorrect and the non-selected predicted target is correct; and
        maintaining the selector when the selected predicted target and the non-selected predicted target are both correct or when the selected predicted target and the non-selected predicted target are both incorrect.

2. The method of claim 1, further comprising:
    selecting an entry from the local count cache based on the instruction fetch address for the group of fetched instructions; and
    storing a first predicted target from the selected entry in the local count cache in an associated local count cache register.

3. The method of claim 2, further comprising:
    selecting an entry from the global count cache based on the instruction fetch address and the global history vector; and
    storing a second predicted target from the selected entry in the global count cache in an associated global count cache register.

4. The method of claim 3, further comprising:
    exclusive ORing the instruction fetch address with the global history vector to provide an index; and
    selecting the entry in the global count cache based on the index.

5. The method of claim 3, further comprising:
    selecting one of the local count cache register and the global count cache register to provide the selected predicted target based on the selector associated with one of the first and second predicted targets.

6. The method of claim 5, further comprising:
    updating, based on whether the first predicted target was determined to be a correct target following execution of the indirect branch instruction, a first count associated with the first predicted target in the local count cache.

7. The method of claim 6, further comprising:
    incrementing the first count in response to the first predicted target being the correct target; and
    decrementing the first count in response to the first predicted target not being the correct target.

8. The method of claim 5, further comprising:
    updating, based on whether the second predicted target was determined to be a correct target following execution of the indirect branch instruction, a second count associated with the second predicted target in the global count cache.

9. The method of claim 8, further comprising:
    incrementing the second count in response to the second predicted target being the correct target; and
    decrementing the second count in response to the second predicted target not being the correct target.

10. The method of claim 6, further comprising:
    maintaining the entry associated with the second predicted target in the global count cache when the local count cache is selected and the first count is above a predetermined value; and
    replacing the entry in the global count cache when the local count cache is selected and the first count is below the predetermined value.

11. The method of claim 1, wherein at least some of the first and second predicted targets are the same.

12. A processor, comprising:
    a cache memory; and
    a processor core coupled to the cache memory, wherein the processor core is configured to:
    store, based on an instruction fetch address for a group of fetched instructions, first predicted targets for first indirect branch instructions in respective entries of a local count cache;
    store, based on the instruction fetch address and a global history vector for the instruction fetch address, second predicted targets for second indirect branch instructions in respective entries of a global count cache; and select one of the local count cache and the global count cache to provide a selected predicted target for an indirect branch instruction in the group of fetched instructions;

wherein the selecting one of the local count cache and the global count cache to provide the selected predicted target is based on a selector associated with one of the first and second predicted targets; and wherein the processor core is further configured to:
update the selector to move the selector toward the selected predicted target when a non-selected predicted target is incorrect and the selected predicted target is correct;

update the selector to move the selector toward the non-selected predicted target when the selected predicted target is incorrect and the non-selected predicted target is correct; and maintain the selector when the selected predicted target and the non-selected predicted target are both correct or when the selected predicted target and the non-selected predicted target are both incorrect.

13. The processor of claim 12, wherein the processor core is further configured to:
select an entry from the local count cache based on the instruction fetch address for the group of fetched instructions;

store a first predicted target from the selected entry in the local count cache in an associated local count cache register;

select an entry from the global count cache based on the instruction fetch address and the global history vector; and store a second predicted target from the selected entry in the global count cache in an associated global count cache register.

14. The processor of claim 13, wherein the processor core is further configured to:
select one of the local count cache register and the global count cache register to provide the selected predicted target based on the selector associated with one of the first and second predicted targets.

15. The processor of claim 13, wherein the processor core is further configured to:
increment a first count, associated with the first predicted target in the local count cache, in response to the first predicted target being a correct target following execution of the indirect branch instruction; and decrement the first count in response to the first predicted target not being the correct target.

16. The processor of claim 13, wherein the processor core is further configured to:
increment a second count, associated with the second predicted target in the global count cache, in response to the second predicted target being a correct target following execution of the indirect branch instruction; and decrement the second count in response to the second predicted target not being the correct target.

17. The processor of claim 15, wherein the processor core is further configured to:
maintain the entry associated with the second predicted target in the global count cache when the local count cache is selected and the first count is above a predetermined value; and replace the entry in the global count cache when the local count cache is selected and the first count is below the predetermined value.

18. A data processing system, comprising:
the processor of claim 13; and
a data storage subsystem coupled to the processor.

19. The processor of claim 13, wherein the processor core is further configured to:
exclusive OR the instruction fetch address with the global history vector to provide an index; and select the entry in the global count cache based on the index.

20. The processor of claim 12, wherein at least some of the first and second predicted targets are the same.

* * * * *